(12) United States Patent
Sherker et al.

(10) Patent No.: US 12,348,964 B2
(45) Date of Patent: Jul. 1, 2025

(54) NETWORK ACCESS AND MANAGEMENT VIA WIRELESS ACCESS PROFILES

(71) Applicant: Charter Communications Operating, LLC, St. Louis, MO (US)

(72) Inventors: Donald W. Sherker, Englewood, CO (US); Peter A. Ericksen, Castle Rock, CO (US); Jon Jasiunas, Castle Rock, CO (US); Nad P. Weyer, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 410 days.

(21) Appl. No.: 17/379,250

(22) Filed: Jul. 19, 2021

(65) Prior Publication Data
US 2023/0014269 A1    Jan. 19, 2023

(51) Int. Cl.
| | | |
|---|---|---|
| *G06F 7/04* | (2006.01) | |
| *G06F 15/16* | (2006.01) | |
| *H04L 9/40* | (2022.01) | |
| *H04L 29/06* | (2006.01) | |
| *H04W 8/20* | (2009.01) | |
| *H04W 12/06* | (2021.01) | |
| *H04W 12/08* | (2021.01) | |
| *H04W 12/50* | (2021.01) | |
| *H04W 48/08* | (2009.01) | |

(52) U.S. Cl.
CPC .......... *H04W 12/08* (2013.01); *H04L 63/108* (2013.01); *H04W 8/20* (2013.01); *H04W 12/06* (2013.01); *H04W 12/50* (2021.01); *H04W 48/08* (2013.01)

(58) Field of Classification Search
CPC ..... H04W 12/08; H04W 12/06; H04W 12/50; H04L 63/108
USPC .............................................. 726/6
See application file for complete search history.

(56) References Cited

U.S. PATENT DOCUMENTS

| | | | |
|---|---|---|---|
| 11,122,525 B1* | 9/2021 | Khalid ................. | H04W 52/38 |
| 2015/0215784 A1* | 7/2015 | Gunasekara .......... | H04L 63/102 |
| | | | 455/411 |
| 2015/0289132 A1* | 10/2015 | Zhang .................... | H04W 8/18 |
| | | | 726/2 |
| 2017/0111783 A1* | 4/2017 | Zhang .................... | H04W 8/20 |
| 2018/0035291 A1* | 2/2018 | Dowlatkhah ......... | H04W 12/50 |
| 2020/0329364 A1* | 10/2020 | Foti ........................ | H04W 8/18 |
| 2021/0250895 A1* | 8/2021 | Mukherjee ............ | H04W 8/26 |

* cited by examiner

*Primary Examiner* — Jeffrey C Pwu
*Assistant Examiner* — Samuel Ambaye
(74) *Attorney, Agent, or Firm* — Armis IP Law, LLC

(57) ABSTRACT

Communication management hardware controls network access via generation and distribution of wireless access profiles. For example, the communication management hardware receives a network access request from first user equipment to use a network over an open SSID network. In response to detecting that the first user equipment operated by a non-subscriber is not yet authorized to use the network, such as because the first user equipment has not signed up for use of the network, the communication management hardware directs the first user equipment to a portal. The communication management hardware then communicates a wireless access profile to the first user equipment. In one arrangement, the wireless access profile is derived based on input from the first user equipment. The wireless access profile provides the first user equipment wireless access to the network via a secure SSID.

36 Claims, 12 Drawing Sheets

NETWORK ACCESS AND MANAGEMENT VIA WIRELESS ACCESS PROFILES

BACKGROUND

Management of different credentials for each of multiple mobile communication devices and corresponding network access is complex. For example, a service provider may provide wireless access to thousands and thousands of subscribers. Each subscriber typically has a unique username and corresponding password. Each device is assigned a unique network address. A conventional authentication management system must keep track of different credentials associated with each communication device in order to provide network access.

In certain instances, it is desirable to provide non-subscribers as well as subscribers access to a wireless network. Providing non-subscribers access to a network makes it a yet more complex task of managing network access. Non-subscribers of a wireless network must use an open SSID to access the respective network. Use of an open SSID to access the network is undesirable because it typically does not provide a sufficient level of security against hacking of users' personal data.

BRIEF DESCRIPTION OF EMBODIMENTS

Embodiments herein provide novel ways of providing improved management of secured wireless access to a network.

More specifically, a communication management resource (such as implemented via hardware, software, or a combination of hardware and software in one or more locations) controls network access via generation and distribution of wireless access profiles. For example, the communication management hardware receives a network access request from first user equipment to use a network. In response to detecting that the first user equipment is not yet authorized to use the network, such as because the first user equipment has not signed up for use of the network (or secured wireless network services provided by the network), the communication management hardware directs the first user equipment to a portal. The communication management hardware then communicates a wireless access profile over a communication link to the first user equipment. In one arrangement, the wireless access profile such as including credentials is derived based on input from the first user equipment. The wireless access profile (such as credentials) provides the first user equipment wireless access to the network via a secured wireless communication link.

In further example embodiments, the communication management resource receives the network access request prior to an operator of the first user equipment subscribing to any services of a wireless network service provider operating the network. In one embodiment, the first user equipment communicates the network access request over a non-secure wireless communication link to the wireless station. The wireless access profile supports subsequent secured wireless connectivity between the first user equipment and the network.

In still further example embodiments, the input from the first user equipment includes authentication credentials of a user operating the first user equipment.

Further embodiments herein include, via the communication management resource, producing the wireless access profile to include access credentials including a unique identifier value and a password for use by the first user equipment to establish a secure wireless communication link with the network. The wireless access profile can include further information as well. For example, in one embodiment, the communication management resource produces the wireless access profile to specify one or more access types provided by the network to the first user equipment.

In further example embodiments, subsequent to communicating the wireless access profile to the first user equipment, the first user equipment communicates with the network to establish a secured wireless communication link. In such an instance, the wireless station establishes the secured wireless communication link with the first user equipment in response to authentication of the first user equipment via credentials associated with the wireless access profile. The secured wireless communication link provides the first user equipment secured access to the network. In one embodiment, the first user equipment establishes the secured wireless communication link based on a network identifier value (such as an SSID or name of a secured wireless network) retrieved from the wireless access profile. In one embodiment, the network identifier value is a network name in which to establish the secured wireless communication link.

Still further example embodiments herein include, via the communication management resource, providing the first user equipment access to the network in accordance with network usage terms associated with the wireless access profile. In response to detecting expiration of the network usage terms associated with the wireless access profile, the communication management resource redirects the first user equipment to the portal. In response to the redirect to the portal, the communication management resource receives supplemental input from the first user equipment. Based on the supplemental input, the communication management resource updates the network usage terms (network usage information) associated with the wireless access profile. The communication management resource then provides the first user equipment access to the network in accordance with the updated network usage terms associated with the wireless access profile. For example, user equipment may initially sign up to use secure wireless services available via a free trial offer. Subsequent to expiration of the free trial, a respective user of the first user equipment updates the wireless access profile and signs up to a second access service such as use a pay per use subscription.

Embodiments herein are useful over conventional techniques because they facilitate management of providing access to non-subscribers. For example, non-subscribers provide information to a respective portal to create a respective wireless access profile. The wireless access profile is then downloaded to the user equipment for subsequent access to a network. The wireless access profile is updated via further communications over a secured wireless network.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: receive a network access request from first user equipment to use a network; in response to detecting that the first user equipment is not yet authorized to use the network, direct the first user equipment to a portal; and communicate a wireless access profile over a network to the first user equipment, the wireless access profile derived based on input from the first user equipment, the wireless access profile providing the first user equipment wireless access to the network.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a further summary as well as detailed description) and corresponding figures of the present disclosure as further discussed below.

Figure 1:
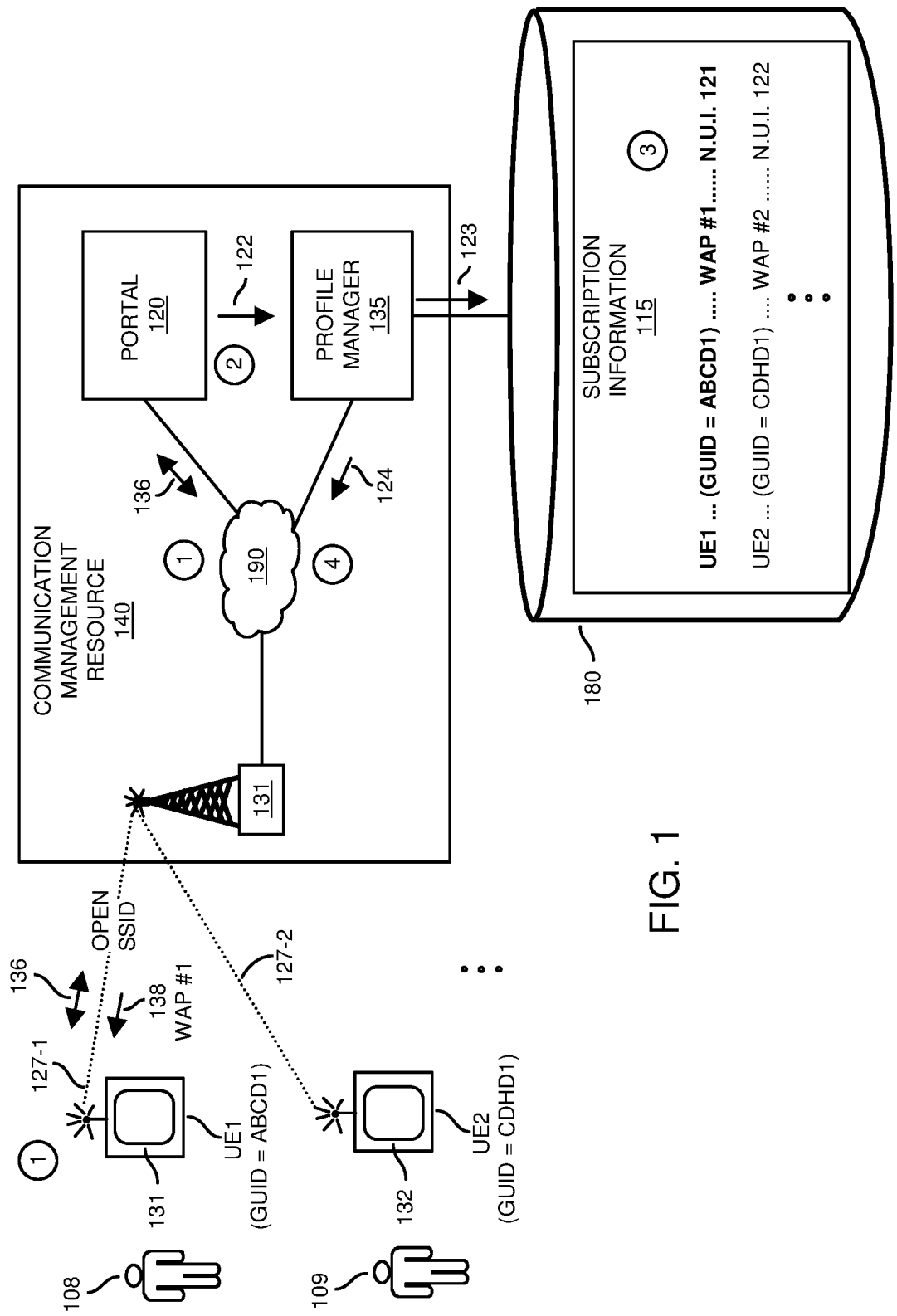
FIG. 1 is an example diagram illustrating a communication system implementing management of wireless access profiles including redirection to a portal and distribution of wireless access profile information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Communication management hardware controls network access via generation and distribution of wireless access profiles. For example, the communication management hardware receives, via an open SSID wireless connection, a network access request from first user equipment to use a network. In response to detecting that the first user equipment (such as operated by a non-subscriber) is not yet authorized to use the network, such as because the first user equipment has not signed up for use of the network, the communication management hardware directs the first user equipment to a portal. Subsequent to receiving information from the user via the portal, the communication management hardware generates a wireless access profile and then communicates the wireless access profile to the first user equipment. In one arrangement, the wireless access profile is derived based on input from the first user equipment. The wireless access profile thereafter provides the first user equipment wireless access to the network via a secured SSID.

Thus, embodiments herein include a method to install a profile on a wireless device in order to provide the wireless device subsequent secured access to a wireless network.

In one embodiment, in order to access a wireless network, users must first visit a captive portal to be authenticated via a pre-determined method. The captive portal initiates installation of a wireless access profile on the user equipment. The wireless access profile is used to automatically authenticate the device on the secure network when the device attempts to use the corresponding wireless services.

In further example embodiments, the wireless access profile includes a unique credential that is used by the core network to determine if the user equipment is to be granted wireless access. Additionally, the wireless access profile indicates a respective service or level of access to provide the device.

In one configuration, during initial connection to the open authentication SSID, the captive portal generates and stores a unique credential in an external user database. This database stores the credentials along with access window information (network usage terms, network usage information, etc.) associated with the device. The captive portal redirects the device to an appropriate server that installs the wireless access profile on the device. After the wireless access profile is installed on the device, the device will then connect to a secure SSID to establish a secured wireless communication link. For the duration of an access window (such as duration of time granted to the user), the device is granted access to a network via the secured wireless communication link.

The device can repeatedly reconnect to the Secure Auth SSID for the duration of the access window (as stored in the external database). After the window of time expires, the system as discussed herein redirects the device to a portal on a subsequent attempt by the device to establish a secured wireless communication link. Upon redirection, the user is provided an opportunity to choose another network access type (if available). If the user chooses another network access type, the corresponding portal server updates the credential and related information in the database associated with that device and disconnects the session on the network router. In one embodiment, the session disconnect occurs in response to updating a type of access associated with the device. The disconnect (i.e., of the user equipment from the wireless network) triggers an authentication request from the device to use the update access type, which grants the device the newly chosen type of access network (such as Pay Per Use, Free Trial, Event, Promo code, Vanity, etc.).

In one embodiment, via the external database, the portal server stores credentials associated with the device such as: username, password, access type (free trial, pay per use, etc.), access tier, Access Expiration time, reauthentication availability (if any), etc. This information is used by a geographical area policy server to authenticate and authorize device for use of a wireless network.

Now, more specifically, with reference to the drawings, FIG. 1 is an example diagram illustrating a communication system implementing management of wireless access profiles including redirection to a portal and distribution of wireless access profile information according to embodiments herein.

In this example embodiment, the network environment 100 includes communication management resource 140, repository 180, and multiple instances of user equipment including user equipment UE1, UE2, etc. Communication management resource 140 includes one or more wireless stations such as wireless station 131, network 190, portal 120, and profile manager 135. Repository 180 stores subscriber or subscription information 115 associated with each instance of user equipment.

Note that each of the resources as discussed herein can be configured to operate as hardware, executed software, or a combination of hardware and software.

More specifically, the communication management resource 140 as discussed herein can be implemented as communication management hardware, communication management software, or a combination of communication management hardware and communication management software; each instance of user equipment can be implemented as user equipment hardware, user equipment software, or a combination of user equipment hardware and user equipment software; portal 120 can be implemented as portal hardware, portal software, or a combination of portal hardware and portal software; profile manager 135 can be implemented as profile manager hardware, profile manager software, or a combination of profile manager hardware and profile manager software; and so on.

Assume in this example embodiment that the user 108 operating the user equipment UE1 (a.k.a., mobile communication device) is initially a non-subscriber of wireless network service provider operating communication management resource 140 and corresponding wireless station 131. As further discussed herein, the communication management resource 140 allows a respective user to sign up for services via an open SSID associated with the wireless station 131.

For example, initially, in processing operation #1, the user equipment UE1 learns (such as during discovery) of an availability of the wireless station 131 via receipt of communications indicating the OPEN SSID supported by the wireless station 131. In response to the user 108 providing input to the user equipment UE1 requesting to establish a wireless communication link with the wireless station 131, the user equipment UE1 communicates a request (such as via communications 136) to the wireless station 131 to access the network 190.

Because the user 108 is still a non-subscriber with respect to the wireless network service provider operating the communication management resource 140, in processing operation #1, the wireless station 131 directs the request to the portal 120. As further discussed herein, the portal 120 allows the user 108 to sign up for one or more wireless services (such as Wi-Fi™ or other suitable type of wireless services) provided by the communication management resource 140.

Figure 2:
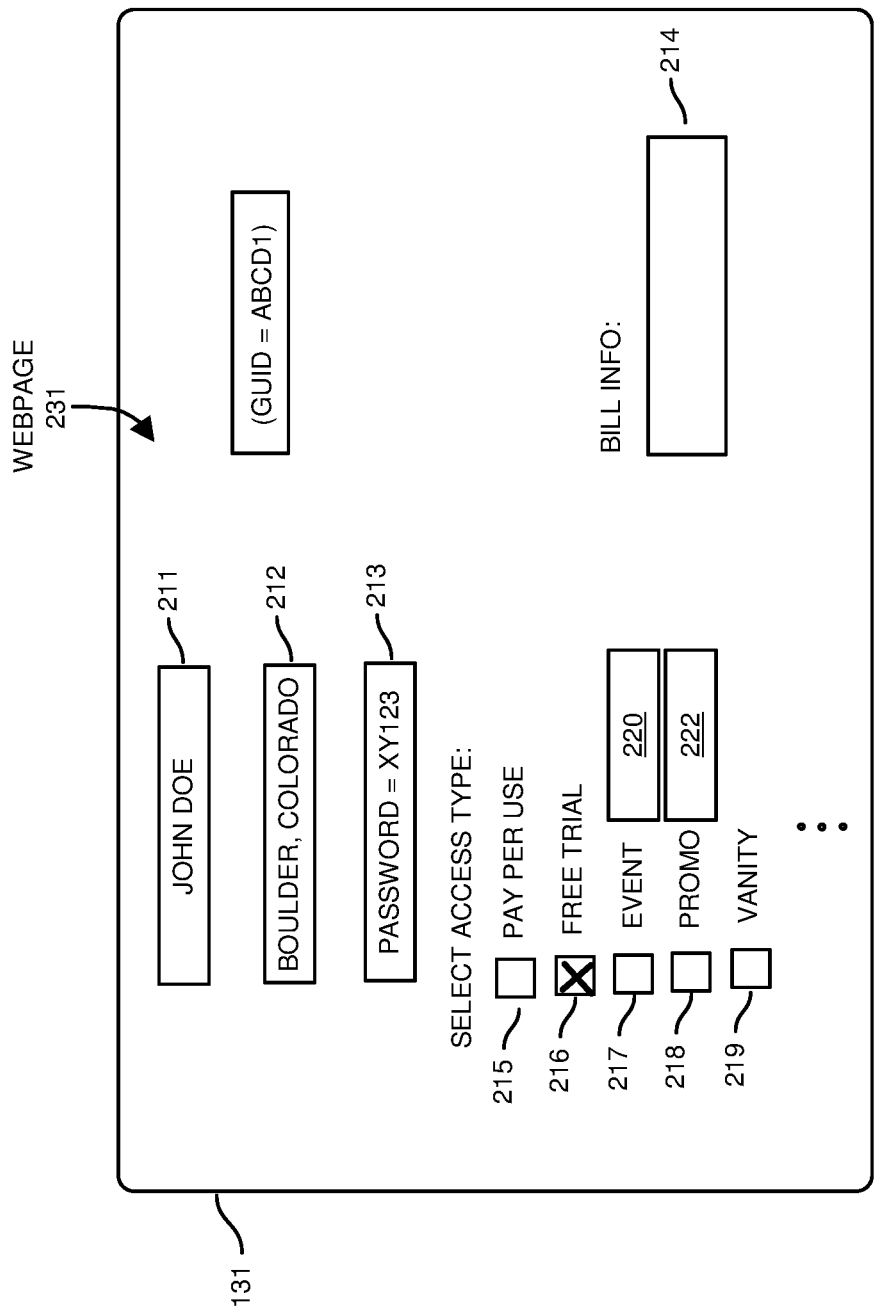
FIG. 2 is an example diagram illustrating a portal (such as a web page) providing an interface in which non-subscribers sign up for use of a wireless network according to embodiments herein.

Details of the web page supplied (such as via communications 136) by the portal 120 to the user equipment UE1 for display on the display screen 130 of the user equipment UE1 is shown in FIG. 2.

FIG. 2 is an example diagram illustrating a portal (such as a web page) providing an interface in which non-subscribers sign up for use of a wireless network according to embodiments herein.

Web page 231 is displayed on display screen 131 of the user equipment UE1 in response to the user 108 connecting the user equipment to the wireless station 131.

To access the network 190 via wireless access services, the user 108 of the user equipment UE1 provides information such as his/her name in data field 211 of web page 231 provided by the portal 120; the user 108 of the user equipment UE1 provides information such as his/her address information in data field 212 of the web page 231; the user 108 of the user equipment UE1 provides information such as a password in data field 213 of the web page 231; if applicable, the user 108 of the user equipment UE1 provides information such as credit card information (number, expiration date, etc.) in data field 214 of the web page 231.

Additionally, via web page 231, the user of the user equipment UE1 selects one or more types of access in which to use wireless services provided by a wireless network service provider operating the communication management resource 140.

For example, the user 108 selects data field 215 to indicate a desire to use network 190 via a pay per use type of subscription; the user 108 selects data field 216 to indicate a desire to use network 190 via a free trial subscription; the user 108 selects data field 217 to indicate a desire to use network 190 via an event sponsoring use of the network 190 (which may require the user 108 to enter a name of the event or special code associated with the event in data field 220); the user 108 selects data field 218 to indicate a desire to use network 190 via a promotion provided by the wireless network service provider or other suitable entity (which may require the user 108 to enter a promotional code associated with the event in data field 221); the user 108 selects data field 219 to indicate a desire to subscribe to a vanity subscription; and so on.

In this example embodiment, the user 108 initially selects the free trial option that provides wireless network services.

Referring again to FIG. 1, thus, in response to detecting that the first user equipment UE1 is not yet authorized to use the network 190, such as because the first user equipment UE1 has not signed up for use of the network 190 (or secured wireless network services provided by the network 190), the wireless station 131 directs the first user equipment UE11 to portal 120 that supplies user corresponding web page 231.

As further shown, in one embodiment, in processing operation #2, the portal 120 (i.e., user information management entity) communicates the user information (such as username, user address information, network address assigned to the user equipment UE1, password information supplied to data field 213, selected one or more access types, etc.) received from the user 108 via the web page 231 to the profile manager 135.

In this example embodiment, the profile manager 135 or other suitable communication management entity derives wireless access profile #1 (WAP #1) for user 108 based at least in part on the user information received from the web page 231 (i.e., interface). For example, the user 108 selects free trial. In such an instance, the profile manager 135 creates the wireless access profile WAP #1 to support a free trial of wireless network services.

As further discussed herein, the wireless access profile WAP #1 (such as including access credentials) provides the first user equipment UE1 wireless access to the network via a secured wireless communication link.

More specifically, the wireless access profile WAP #1 provides the user 108 and corresponding user equipment UE1 access to the network 190 via a secured SSIDXY (associated with wireless access profile WAP #1) instead of an open SSID. In one embodiment, the communication management resource 140 receives the network access request to sign up for the use of network 190 prior to an operator (user 108) of the first user equipment UE1 subscribing to any services of a wireless network service provider operating the network 190.

As previously discussed, the first user equipment UE1 communicates the network access request over a non-secure wireless communication link (established via an open SSID) to the wireless station 131.

In processing operation #3, via communications 123, the profile manager 135 stores the wireless access profile WAP #1 generated for use by the user equipment UE1 for storage in repository 180 as subscription information 115.

In this example embodiment, the subscription information 115 associated with user equipment UE1 and corresponding user 108 includes a globally unique identifier value (GUID) assigned to the user equipment UE1 and/or corresponding user 108, wireless access profile WAP #1 assigned to the user equipment UE1 and/or corresponding user 108, network usage information 321 (see FIG. 3) associated with the corresponding user equipment UE1 and/or user 108, and so on.

Note that the GUID can be any suitable value such as a network address assigned of the user equipment UE1, new unique identifier value assigned to the user equipment UE1 by the profile manager 135 or other suitable entity, etc.

In one embodiment, as further discussed herein, the network usage information 321 (or network usage terms) associated with the wireless access profile WAP #1 includes information such as: data associated with the user equipment UE1 using the network, window of time in which the user equipment UE1 is entitled to use of wireless services provided by the wireless station 131 to access the network 190, bit rate or bandwidth associated with providing the user equipment UE1 wireless services to access network 190, and so on.

As further shown in FIG. 1, subsequent to generating the wireless access profile WAP #1, via communications 138 in processing operation #4, the profile manager 135 or other suitable entity communicates the wireless access profile WAP #1 through network 190 and the wireless station 131 over wireless communication link 127-1 to the user equipment UE1. User equipment UE1 stores (such as downloads) a copy of the wireless access profile WAP #1 to the user equipment UE1.

Figure 3:
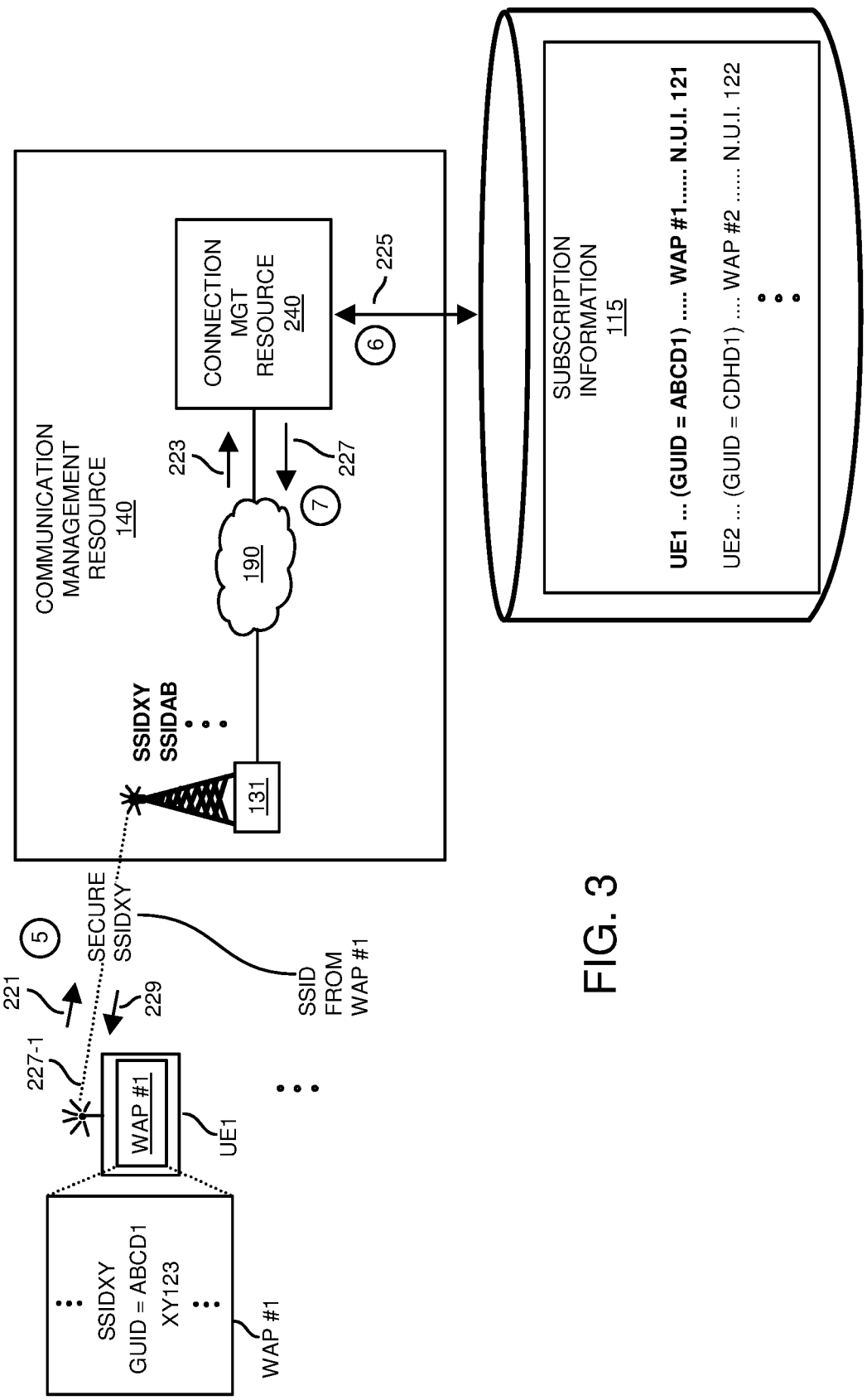
FIG. 3 is an example diagram illustrating use of wireless access profile information to provide access over a secured SSID wireless communication link according to embodiments herein.

Via downloaded wireless access profile WAP #1 and corresponding information on the user equipment UE1, the user equipment UE1 is provided subsequent use of wireless services (or other services) supported by the network 190 as further shown in FIG. 3.

FIG. 3 is an example diagram illustrating use of wireless access profile information to provide access over a secured SSID wireless communication link according to embodiments herein.

In processing operation #5, the user equipment UE1 is disconnected (caused by either the user equipment UE1 disconnecting or the wireless station 131 forcing a disconnect) from the wireless station 131, terminating connectivity via wireless communication link 127-1 (OPEN SSID wireless communication link). In response to detecting that the user equipment UE1 is configured with the wireless access profile WAP #1, in one embodiment, the user equipment UE1 automatically performs an association with the wireless station 131 using detected network assigned SSIDXY (retrieved from the wireless access profile WAP #1) supported by the wireless station 131.

In further example embodiments, the wireless station 131 may broadcast or hide (not broadcast) availability of different secure wireless network identities SSIDXY, SSIDAB, etc.

In furtherance of connecting to the wireless station 131 via a secure SSID, in processing operation #5, the user equipment UE1 communicates a request (such as via communications 221) to wirelessly connect to the wireless station 131 to access network 190 (such as the Internet). In one embodiment, the request indicates to connect to the wireless station 131 using the newly received network identifier SSIDXY stored in the wireless access profile WAP #1, which is a secured wireless network compared to the OPEN SSID used in FIG. 1 to communicate with the wireless station 131.

Referring again to FIG. 3, in one embodiment, the user equipment UE1 detects from the wireless access profile WAP #1 that wireless network assigned SSIDXY is a preferred network in which to establish wireless connectivity. The user equipment UE1 automatically uses the specified network identifier SSIDXY (and authentication information GUID=ABCD1 and PASSWORD=XY123) as a basis to connect to the wireless station 131 and corresponding network 190 after the wireless access profile WAP #1 is installed on the user equipment UE1.

In one embodiment, the wireless station 131 is configured to communicate identities of the different wireless networks available (such as a wireless network assigned SSIDXY) from the wireless station 131. For example, in one embodiment, during discovery (such as via broadcast of one or more beacon communications from the wireless station 131 and received by the user equipment UE1), the user equipment UE1 learns of the availability of the wireless network SSIDXY supported by wireless station 131. Alternatively, as previously discussed, the wireless station 131 prevents broadcast of SSIDXY, SSIDAB, etc.

The user equipment UE1 is authenticated during processing operation #6. For example, after initially establishing new wireless connectivity 227-1 with the wireless station 131, the user equipment UE1 retrieves access information such as GUID=ABCD1 and PASSWORD=XY123 from the wireless access profile WAP #1 and communicates it to the wireless station 131 and/or connection management resource 240.

During authentication, connection management resource 240 compares the received access information from the user equipment UE1 to the information stored in wireless access profile WAP #1 of repository 180. In response to a match of the received password and GUID from the user equipment UE1 to the password and GUID in the wireless access profile WAP #1 of repository 180, the connection management resource 240 notifies the wireless station 131 that the user equipment UE1 is authorized to use wireless network services associated with SSIDXY.

In processing operation #7, in response to detecting from authentication by the connection management resource 240 that the user equipment UE1 is entitled to use wireless network services associated with the respective network SSIDXY, the connection management resource 240 also loads stored device information (such as network usage information 321 or network usage terms) associated with the user equipment UE1 for monitoring of the user equipment UE1 and use of wireless network services provided by the SSIDXY.

Figure 4:
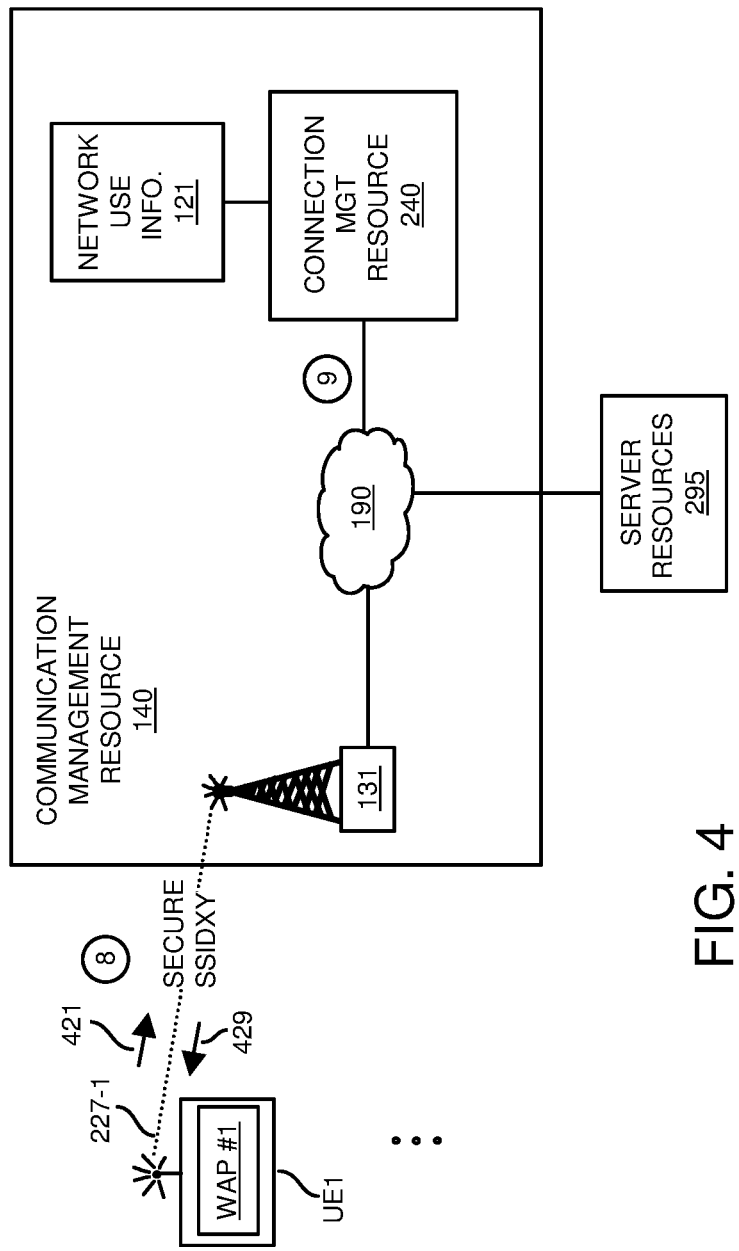
FIG. 4 is an example diagram illustrating monitoring of a secured wireless communication link according to embodiments herein.

FIG. 4 is an example diagram illustrating monitoring of a secured wireless communication link according to embodiments herein.

As shown in FIG. 4, in processing operation #8, after the user equipment UE1 is authenticated to use wireless services, the wireless station 131 provides the user equipment UE1 access to network 190 via wireless communication link 227-1.

After providing a wireless connection (via wireless communication link 227-1) and during the monitoring of user equipment UE1 using wireless network services, the connection management resource 240 enforces limitations of wireless network services associated with the wireless access profile WAP #1 in a manner as specified by the network usage information 321. Wireless communications 421 support upstream communications from the user equipment UE1 to the network 190; wireless communications 429 support downstream communications from the wireless station 131 to the user equipment UE1.

For example, as previously discussed, the wireless access profile WAP #1 can be configured to indicate access limitations such as time limitations of using network service associated with SSIDXY, bit rate limitations of using network services associated with the SSIDXY, access type limitations of using network services associated with the SSIDXY, etc.

Thus, the connection management resource 240 provides the user equipment UE1 wireless network services to the user equipment UE1 in accordance with the limitations as specified by or associated with the wireless access profile WAP #1 and/or network usage information 321 (such as network usage terms).

Figure 5:
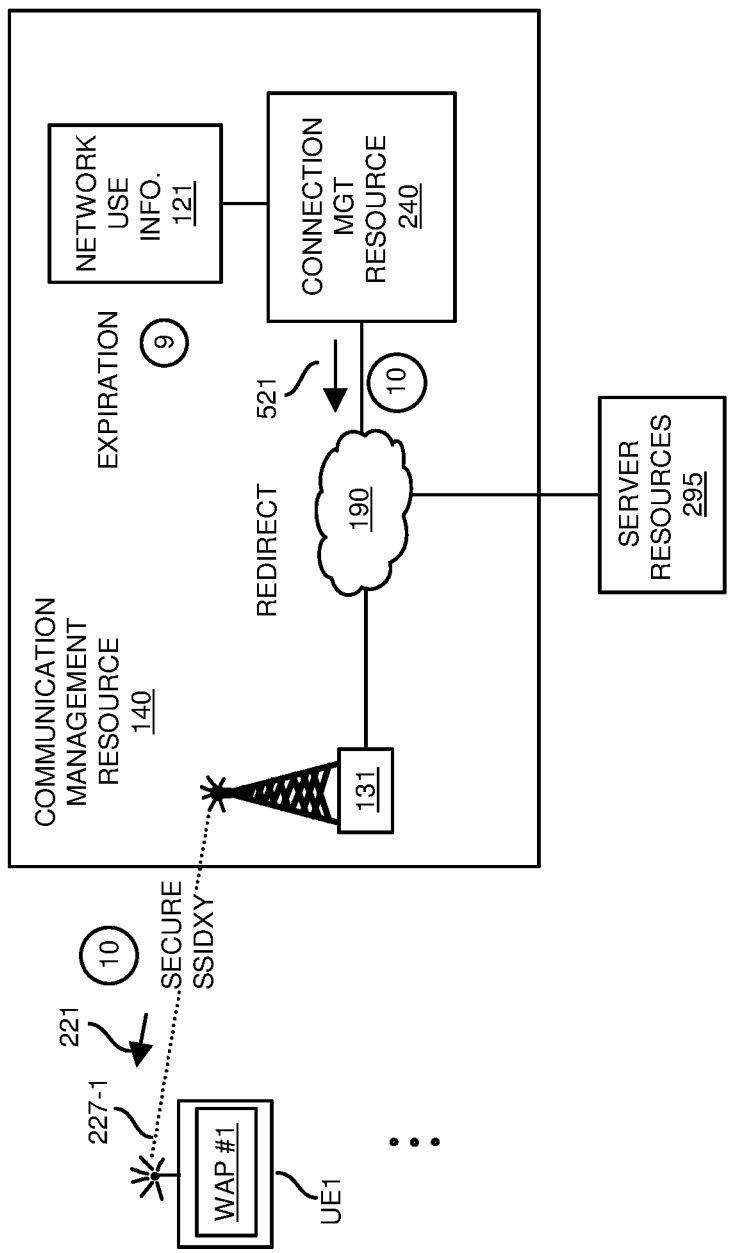
FIG. 5 is an example diagram illustrating detection of expired wireless services associated with a wireless access profile according to embodiments herein.

FIG. 5 is an example diagram illustrating detection of expired wireless services associated with a wireless access profile according to embodiments herein.

In processing operation #9, the connection management resource 240 detects expiration of a respective usage plan (via network usage terms) associated with wireless access profile WAP #1 assigned to the user equipment UE1. As previously discussed, this can include detecting one or more conditions such as that the user equipment UE1 was provided wireless access (via SSIDXY) for a limited time duration associated with the wireless access profile WAP #1 and that limited time has expired; detecting that the user equipment UE1 retrieves an accumulated amount of data (via SSIDXY) greater than a threshold level; and so on.

In such an instance of detecting usage of the user equipment UE1 reaching a limit, in processing operation #10, the connection management resource 240 notifies the wireless station 131 (such as via communications 521) to terminate wireless network access provided to the user equipment UE1. In one embodiment, processing operation #10 further includes causing the display screen 131 to display a termination notification in response to termination of the wireless access service. Accordingly, the user 108 is notified of the terminated use.

Figure 6:
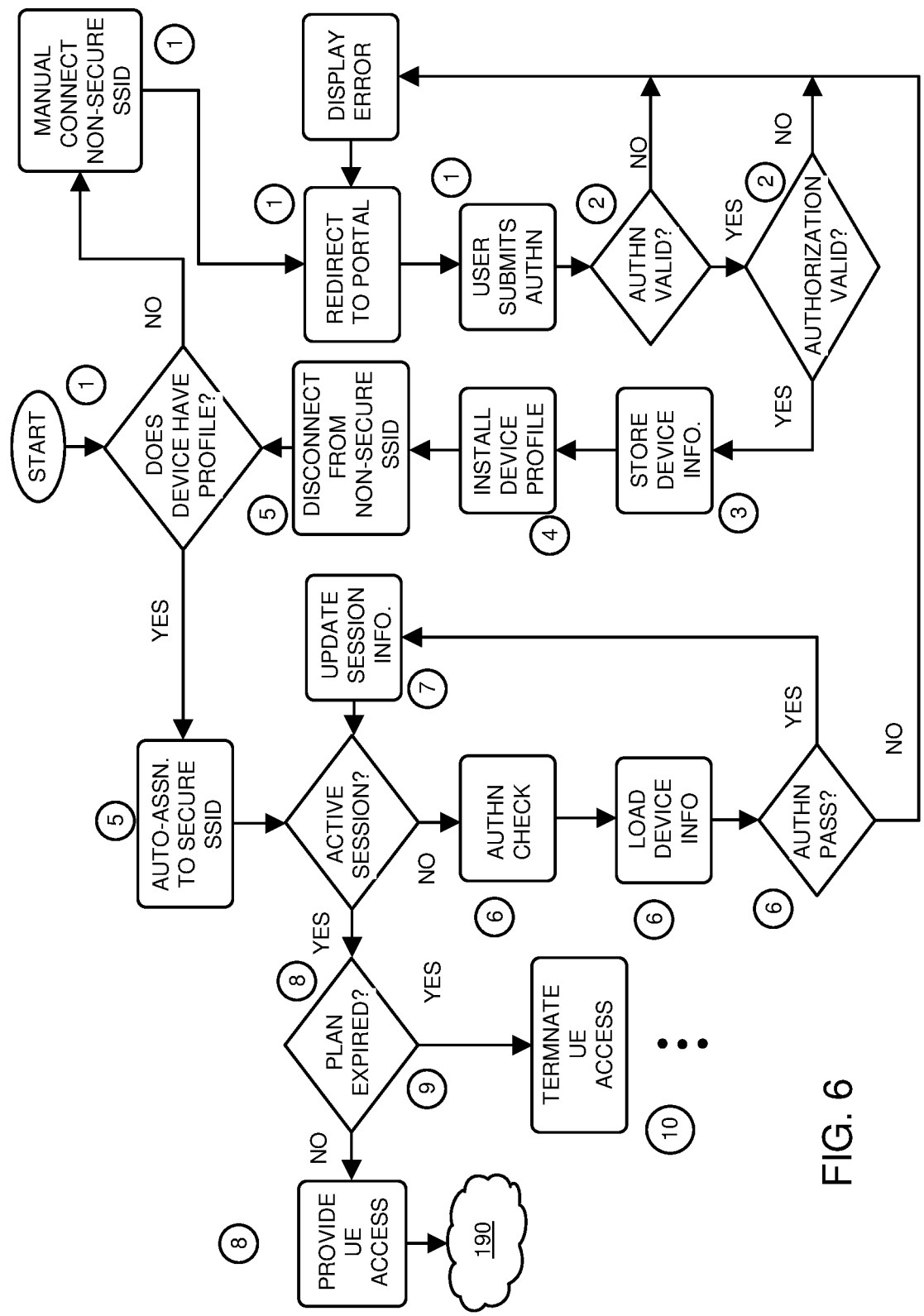
FIG. 6 is an example diagram illustrating a flow diagram of providing a user wireless access profile information and use of a respective network according to embodiments herein.

FIG. 6 is an example diagram illustrating a flow diagram of providing a user wireless access profile information and use of a respective network according to embodiments herein.

In this example embodiment, in processing operation #1, the user equipment UE1 or communication management resource 140 detects that the user equipment UE1 does not have an assigned wireless access profile. In response to this condition, the user equipment UE1 manually connects to the wireless station 131 via an OPEN SSID (such as a connection not requiring the user 108 or user equipment UE1 to provide a password or other authentication information). Because the user equipment UE1 does not have a wireless access profile at this point, the wireless station 131 directs the user equipment UE1 to the portal 120. Via a web page 231 or other interface associated with the portal 120, the user 108 provides authentication information and corresponding personal information as previously discussed over the open SSID wireless communication link to establish a wireless access profile.

In processing operation #2, the communication management resource 140 applies authentication rules and determines whether the authentication information received from the user equipment is valid. If the authentication information is found to be invalid, the communication management resource 140 initiates display of an error on the display screen 131 of the user equipment UE1. If the provided information is valid, the communication management resource 140 applies one or more rules to determine if the user equipment UE1 is authorized to use wireless network services supported by with the wireless station 131.

In processing operation #3, the profile manager 135 of the communication management resource 140 creates and stores wireless access profile WAP #1 associated with the user equipment UE1 (device, mobile communication device, etc) in repository 180.

In processing operation #4, the communication management resource 140 communicates the wireless access profile WAP #1 through the wireless station 131 (such as via the wireless communication link 127-1 established via the OPEN SSID) to the user equipment UE1 for installation.

In processing operation #5, the user equipment UE1 is disconnected from the wireless station 131. For example, the wireless communication link 127-1 is terminated. Termination can be caused by any suitable entity such as the wireless station 131, communication management resource 140, user equipment UE1, etc.

Further in processing operation #5, in response to the termination of wireless communication link 127-1, the user equipment UE1 automatically associates with the wireless station 131 using the secure network identifier SSIDXY retrieved from the wireless access profile WAP #1. The communication management resource 140 determines that a session is not yet active for the user equipment UE1.

In processing operation #6, the communication management resource 140 performs an authentication check of the user equipment UE1 attempting to establish a respective wireless communication link via SSIDXY. In one embodiment, as previously discussed, this includes the user equipment UE1 communicating access information (such as the GUID=ABCD1 and password=XY123 associated with downloaded wireless access profile WAP #1) to the communication management resource 140. The communication management resource 140 uses the previously stored wireless access profile WAP #1 in repository 180 to check the newly received access information received from the user equipment UE1. In response to detecting that the received access information is valid, the communication management resource 140 loads device information such as network usage information 321 to update a respective session (such as via network usage information) associated with the user equipment UE1. The session is used to track usage of the wireless network by the user equipment UE1.

In processing operation #8, the communication management resource 140 monitors whether the access plan provided to the user equipment UE1 has expired (such as specified by the network usage terms). If not, the communication management resource 140 provides the user equipment UE1 wireless access connectivity to the network 190. This can include the user equipment UE1 repeatedly using the wireless access profile WAP #1 to access the network 190. The communication management resource 140 can be configured to monitor use of the wireless network services by the user equipment UE1 over different sessions, an accumulation of which is used to determine expiration.

Thus, the communication management resource 140 continuously monitors whether the access plan (wireless access profile WAP #1) associated with the user equipment UE1 has expired.

In processing operation #10, assume that the communication management resource 140 detects that the access plan associated with the wireless access profile WAP #1 has expired. In such an instance, the communication management resource 140 (such as via any of one or more resources such as wireless station 131, connection management resource 240, etc.) terminates the wireless connectivity 227-1 provided to the user equipment UE1. In one embodiment, as further discussed herein, instead of terminating wireless connectivity 227-1, in response to the detected expiration, the communication management resource 140 redirects the user equipment UE1 to an appropriate portal (such as web page) to update the wireless access profile WAP #1.

Figure 7:
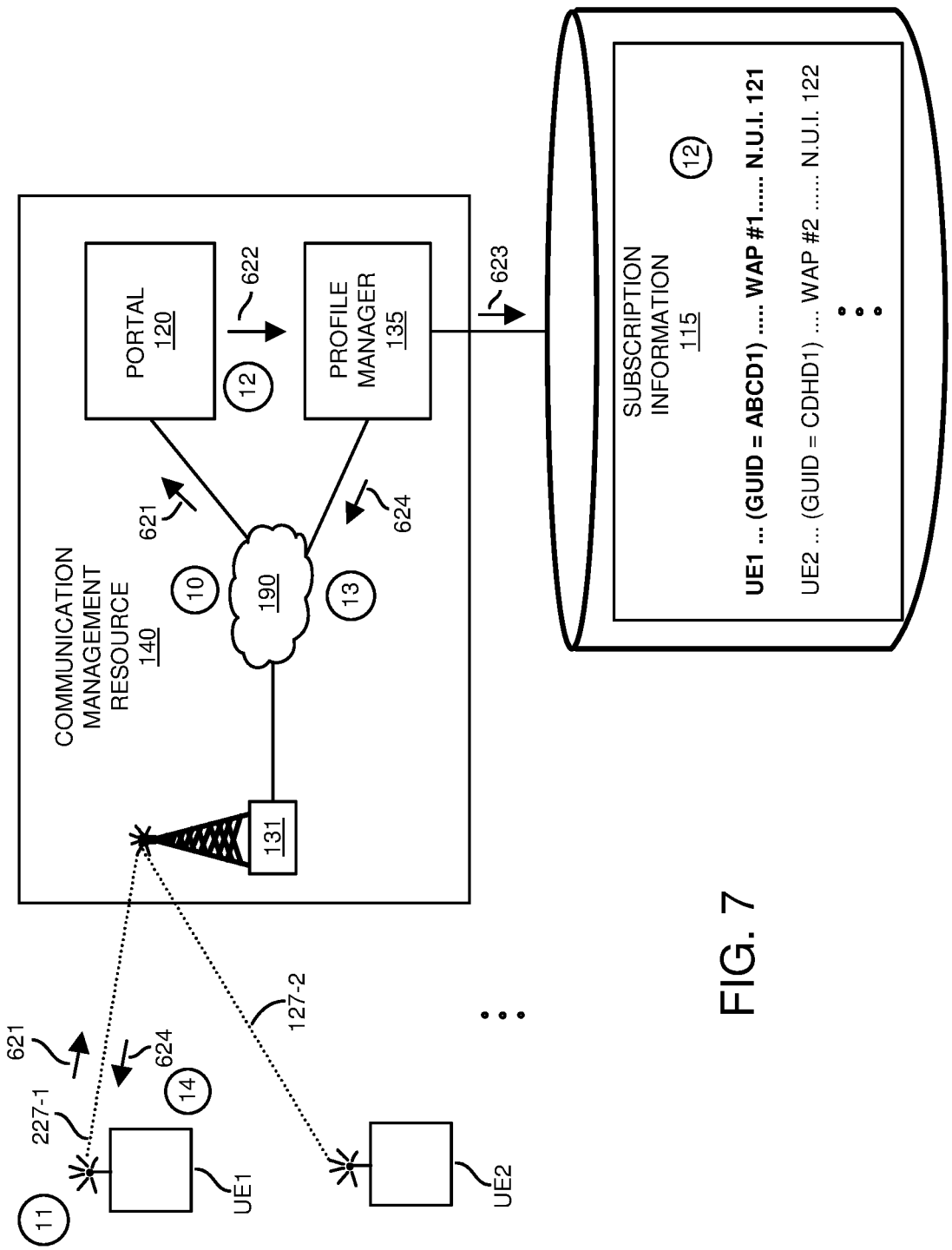
FIG. 7 is an example diagram illustrating update of respective wireless services and providing of wireless services to corresponding user equipment according to embodiments herein.

FIG. 7 is an example diagram illustrating update of respective wireless services and providing of wireless services to corresponding user equipment according to embodiments herein.

As previously discussed, connection management resource 240 terminates use of the wireless access services by user equipment UE1 in processing operation #10.

Further in processing operation #10, in response to detecting plan expiration, the communication management resource 140 or other suitable entity (such as connection management resource 240) redirects the user equipment UE1 to portal 120 (such as web page portal or other web page portal resource) enabling update of the user's service plan. In one embodiment, the user equipment UE1 receives the web page 831 in FIG. 8 to update the wireless access profile WAP #1 via the wireless communication link 227-1 (such as via wireless network SSIDXY).

Figure 8:
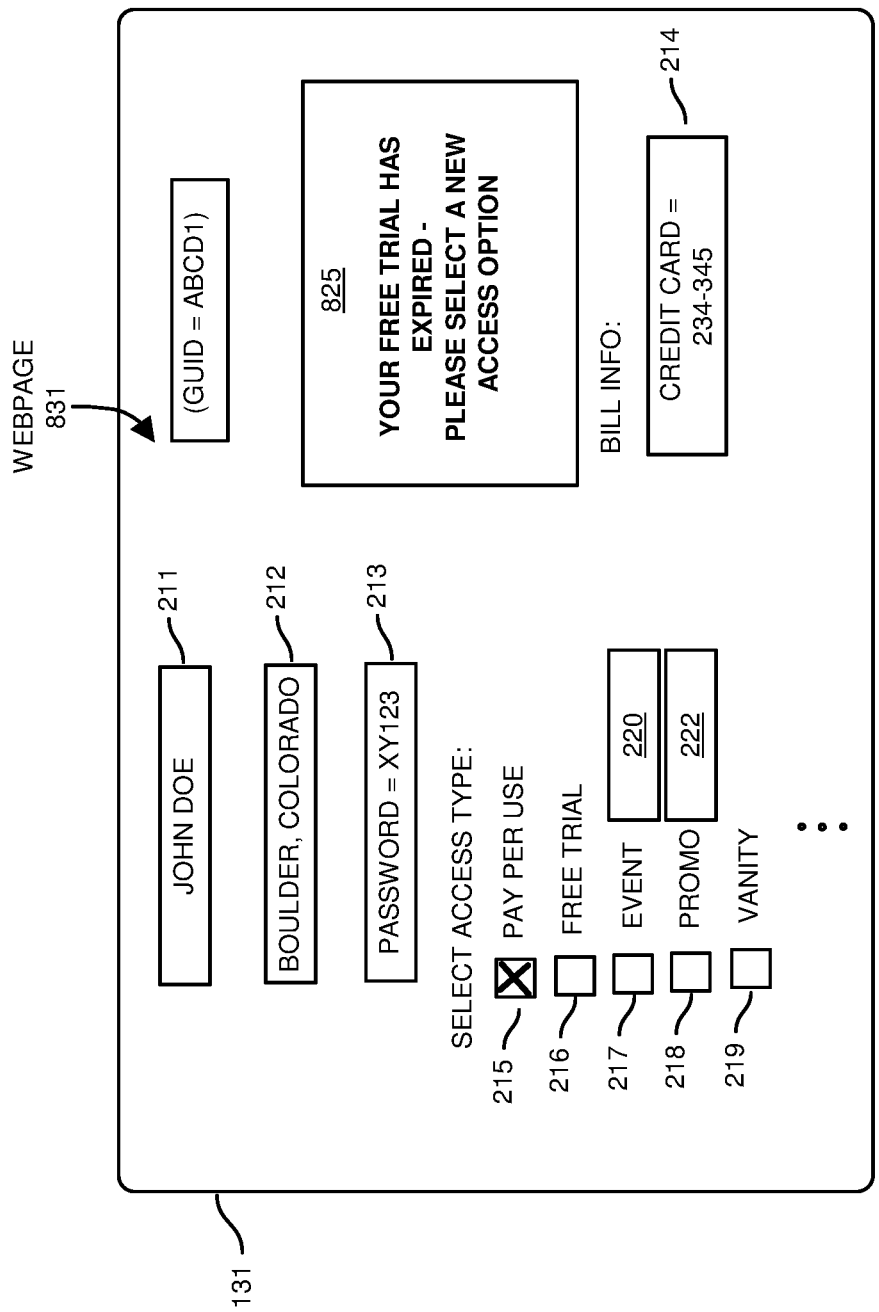
FIG. 8 is an example diagram illustrating a portal (such as a web page) providing an interface in which non-subscribers provide input to update a wireless access profile and corresponding access according to embodiments herein.

FIG. 8 includes a respective notice 825 to the user 108 that the prior selected free trial services has expired. Via further input to the web page 831, the user 108 selects a new service plan (such as access type option 215). In response to the selection of pay per use access, the profile manager 135 updates the corresponding information associated with wireless access profile WAP #1 in repository 180. The update may or may not include communicating the updated wireless access profile WAP #1 to the user equipment UE1.

Referring again to FIG. 7, in processing operation #11, via input to web page 831 (similar in some respects to web page 231) from portal 120 displayed on the display screen 131, the user 108 can switch to a pay per use mode and pay a respective fee (such as supplying credit or debit card information in data field 214) for additional use of wireless network access services (such as duration of time, data retrieval limit, etc.), input a promotional code to use additional services, etc.

In processing operation #12, the communication management resource 140 determines if the additional information from the user 108 and corresponding user equipment UE1 is sufficiently valid information authorizing the user equipment UE1 to use the additional requested access services such as associated with the selected pay per use option. For example, the communication management resource 140 determines whether the user 108 provides proper payment, proper authorization code, proper selection of an access type, etc.

Further in processing operation #12, the communication management resource 140 or other suitable entity such as profile manager 135 updates the access profile WAP #1 based on the new input (such as selection of pay per use mode, payment, code, etc.) provided by the user 108 operating user equipment UE1.

In processing operation #13, via communications through the wireless station 131 to the user equipment UE1, the connection management resource 240 notifies the user equipment UE1 of the updated wireless access profile WAP #1. In one embodiment, via communications 624, the profile manager 135 or other suitable entity communicates the updated wireless access profile WAP #1 to the user equipment UE1. Note that if there are no changes to the wireless access profile WAP #1, there is no need to download a new wireless access profile WAP #1 to the user equipment UE1. In such an instance, then the user equipment UE1 can be configured to use the original installed wireless access profile WAP #1 to access the network 190 through the wireless station 131.

In processing operation #14, the communication management resource 140 provides the user equipment UE1 use of wireless network access services in response to the updated wireless access profile WAP #1. In one embodiment, this includes repeating operations #6-8.

Figure 9:
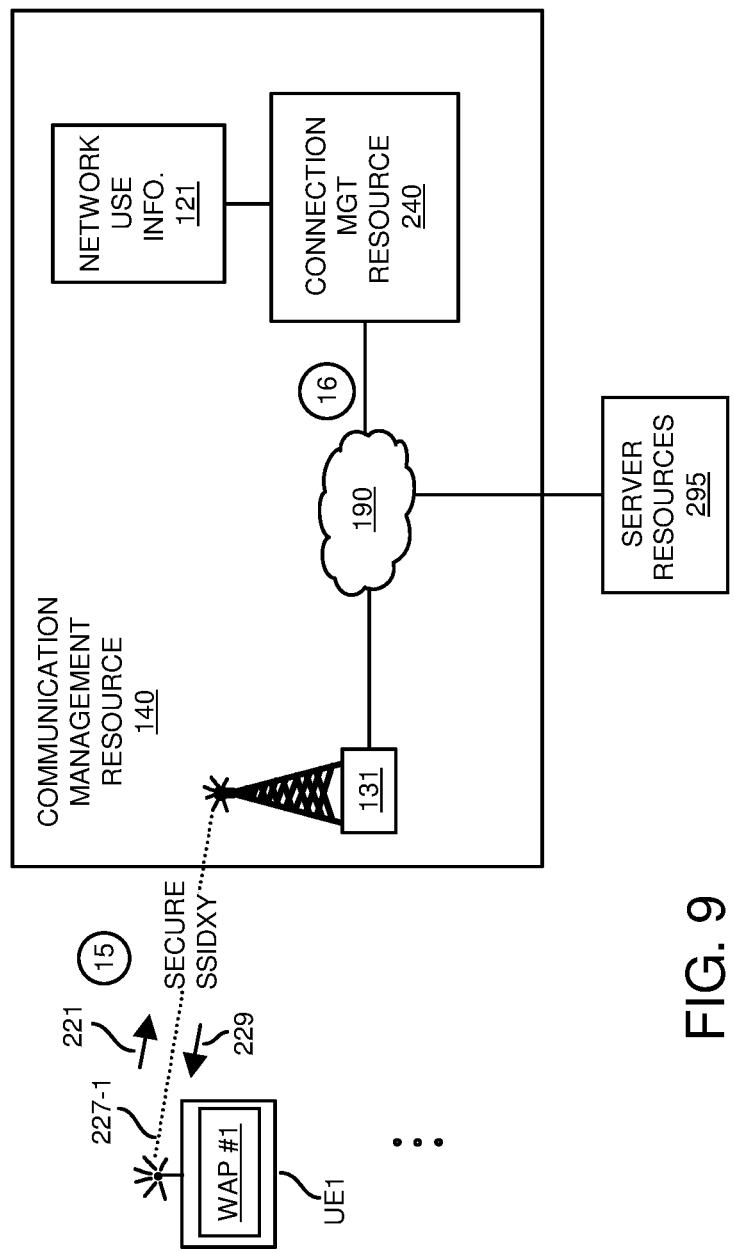
FIG. 9 is an example diagram illustrating use of wireless services by respective user equipment according to embodiments herein

FIG. 9 is an example diagram illustrating use of wireless services by respective user equipment according to embodiments herein.

In processing operation #15, the connection management resource 240 or other suitable entity, in a similar manner as previously discussed, monitors whether the updated access plan associated with wireless access profile WAP #1 has expired or not. If it has not expired, the user equipment UE1 is provided continued use of the wireless services provided by the secure network SSIDXY or any new SSID value provided to the user equipment UE1 with the updated wireless access profile WAP #1. Conversely, if the updated wireless plan associated with the wireless access profile WAP #1 has expired as detected via monitoring operation #16, the user equipment UE1 is no longer provided use of the wireless access services provided by the wireless station 131 and secure network SSIDXY. In other words, in this latter case of expired plan, the connection management resource 240 terminates use of the wireless services until the user 108 updates the profile again via operations #10-14.

Figure 10:
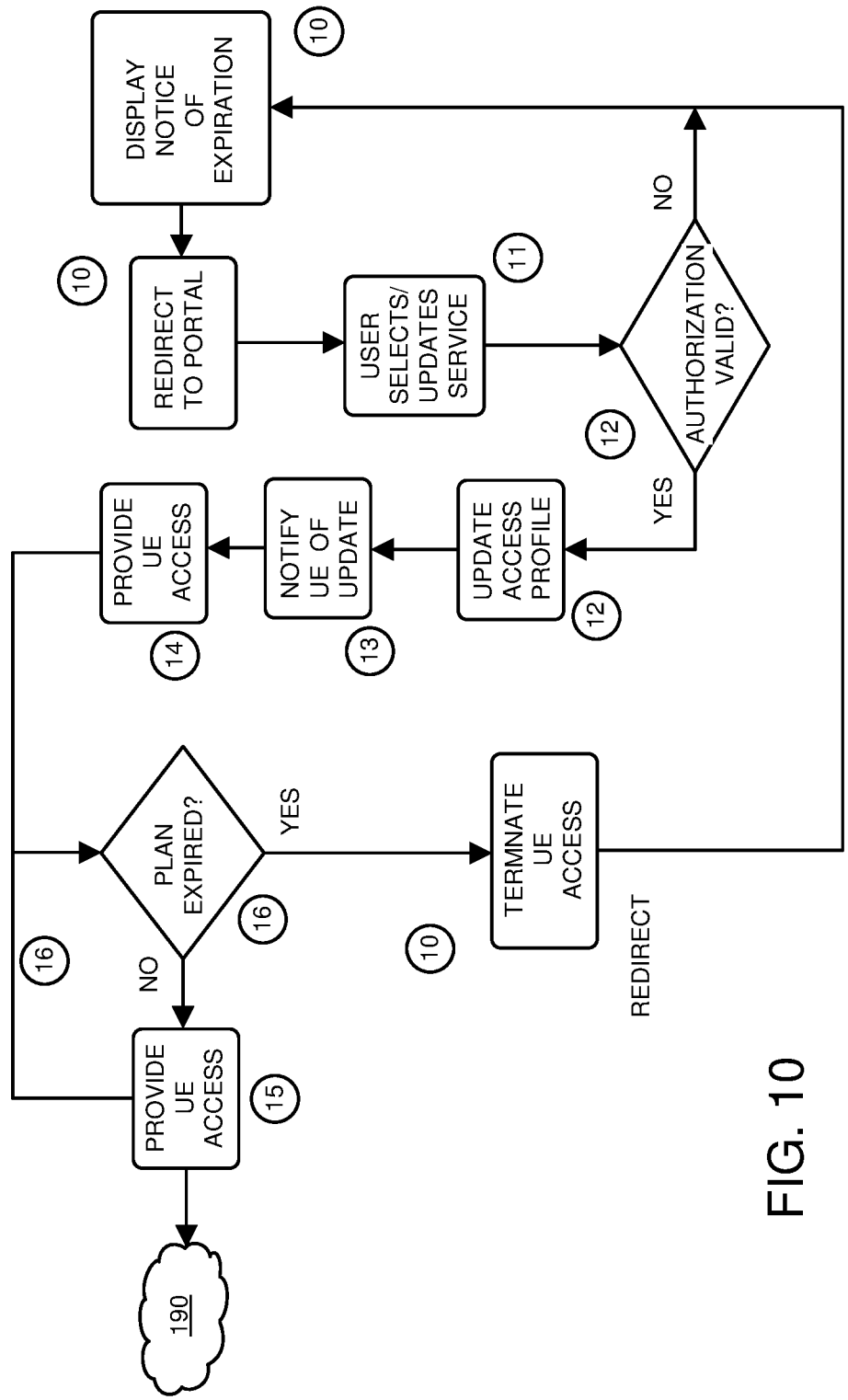
FIG. 10 is an example diagram illustrating a flow diagram of updating wireless access profile information and subsequent grant of network access to user equipment according to embodiments herein.

FIG. 10 is an example diagram illustrating a flow diagram of updating wireless access profile information and subsequent grant of network access to user equipment according to embodiments herein.

As shown in FIG. 10, in response to detecting expiration of the plan (such as free trial plan) associated with wireless access profile WAP #1 in processing operation #10, the communication management resource 140 or connection management resource 240 terminates use of the wireless access services by user equipment UE1 in processing operation #10. As previously discussed, in one embodiment, processing operation #10 further includes causing the display screen 131 to display a notification 825 in response to termination of the wireless access service. Accordingly, the user 108 is notified of the expiration.

Further in processing operation #10, the communication management resource 140 or other suitable entity (such as connection management resource 240) redirects the user equipment UE1 to portal 120 (or other portal resource) enabling update of the user's service plan. For example, in processing operation #11, via input to a web page 825 from portal 120 displayed on the display screen 131, the user 108 can pay a fee for additional use of wireless network access services (such as duration of time, data retrieval limit, etc.), input a promotional code to use additional services, etc.

In processing operation #12, the communication management resource 140 determines if the additional information from the user 108 and corresponding user equipment UE1 is sufficiently valid information authorizing the user equipment UE1 to use the additional requested access services. Further in processing operation #12, the communication management resource 140 or other suitable entity updates the access profile WAP #1.

In processing operation #13, via communications through the wireless station 131 to the user equipment UE1, the connection management resource 240 notifies the user equipment UE1 of the updated wireless access profile WAP #1 or that the wireless access profile WAP #1 has been properly updated and that the user 108 is able to use sled wireless access services.

In processing operation #14, the communication management resource 140 provides the user equipment UE1 use of wireless network access services in accordance with the updated wireless access profile WAP #1.

In processing operation #15 and #16, the connection management resource 240 again monitors whether the updated access plan associated with wireless access profile WAP #1 has expired or not. If not, the user equipment UE1 is provided continued use of the wireless services provided by the secure network SSIDXY. Conversely, if the updated wireless plan associated with the wireless access profile WAP #1 has expired, the user equipment UE1 is no longer provided use of the wireless services provided by the secure network SSIDXY or other provided secure SSID. In other words, in this latter case of detecting expiration of the updated plan (such as due to non-payment of fees), the connection management resource 240 terminates use of the wireless services until the user 108 updates the profile again via operations #10-14.

Figure 11:
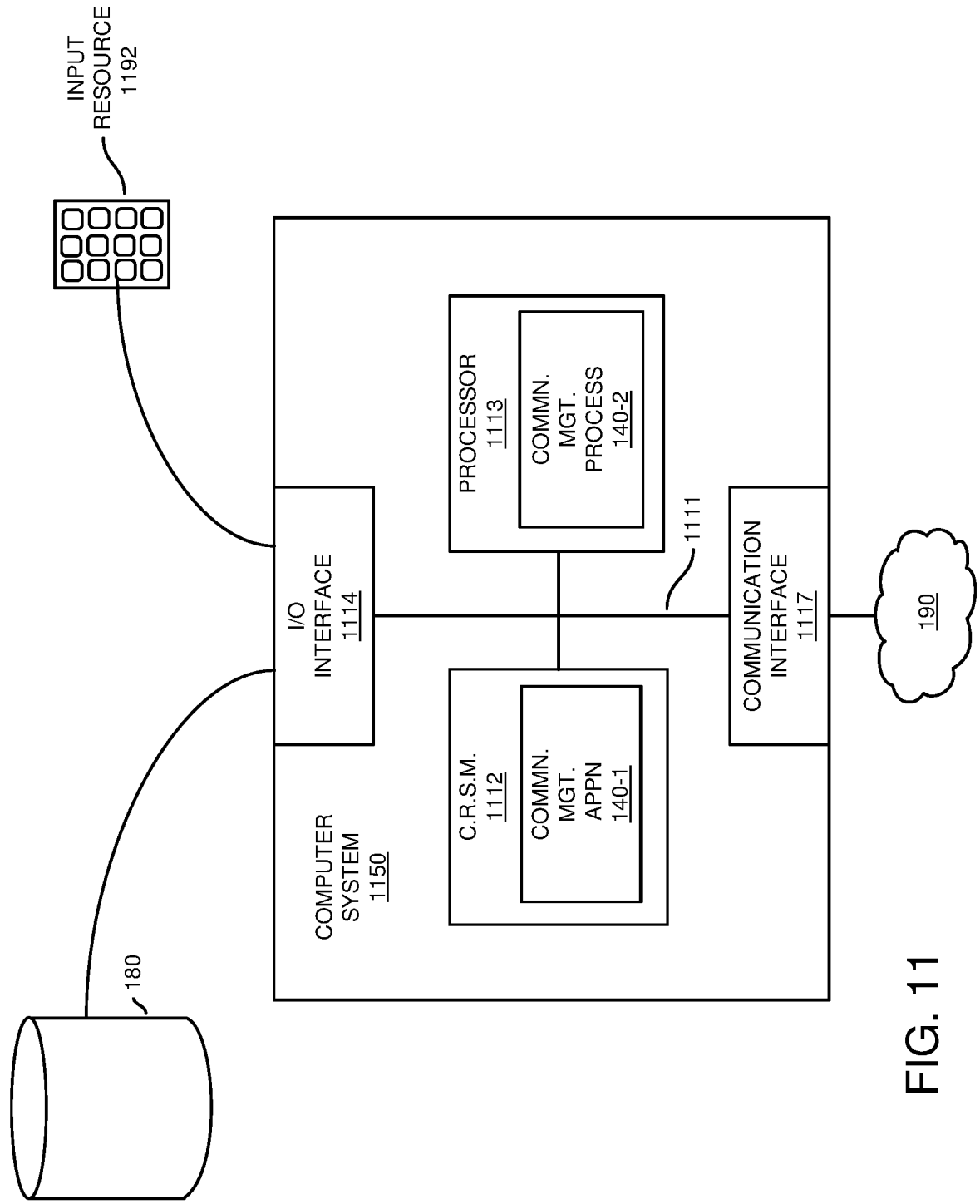
FIG. 11 is an example diagram illustrating example computer architecture operable to execute one or more operations according to embodiments herein.

FIG. 11 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 1150 of the present example includes an interconnect 1111 that coupling computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 11. Note that the steps in the flowcharts below can be executed in any suitable order.

Figure 12:
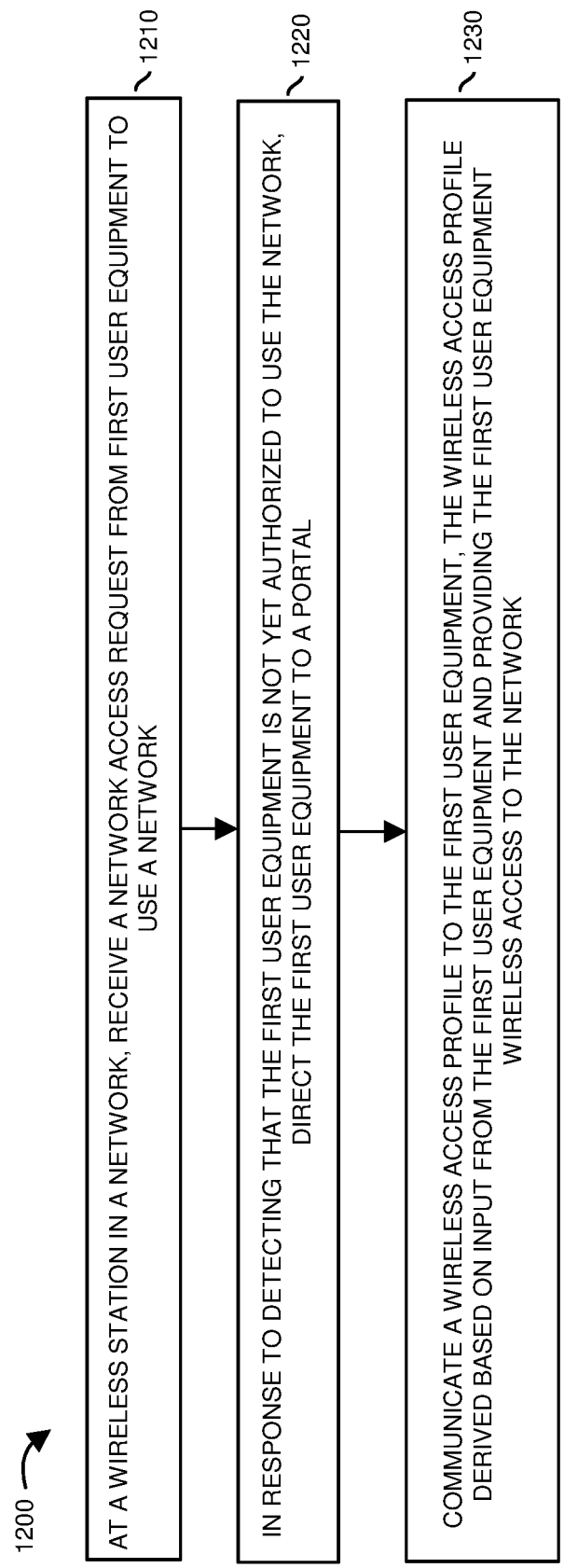
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, wireless station 131 receives a network access request from first user equipment UE1 to use network 190.

In processing operation 1220, in response to detecting that the user equipment UE1 is not yet authorized to use the network 190, the wireless station 131 directs the first user equipment UE1 to a portal 120.

In processing operation 1230, the wireless access point 131 communicates a wireless access profile WAP1 to the first user equipment UE1. The wireless access profile WAP1 is derived based on input from the first user equipment UE1. The wireless access profile WAP1 provides the first user equipment UE1 wireless access to the network 190.

Note again that techniques herein are well suited to facilitate management of providing access to non-subscribers of a respective network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. A method comprising:
receiving a network access request from first user equipment to use a network;
in response to detecting that the first user equipment is not yet authorized to use the network, directing the first user equipment to a portal;
communicating a wireless access profile to the first user equipment, the wireless access profile derived based on input from the first user equipment to the portal, the wireless access profile configured to provide the first user equipment wireless access to the network; and
wherein communicating the wireless access profile to the first user equipment includes communicating the wireless access profile from a wireless base station in the network to the first user equipment over a first wireless communication link to the first user equipment, the wireless access profile including an identity of a secured wireless network supported by the wireless base station.

2. The method as in claim 1, further comprising:
receiving the network access request prior to an operator of the first user equipment subscribing to any services of a wireless network service provider operating the network.

3. The method as in claim 2, wherein the first user equipment communicates the network access request over a non-secure wireless communication link to a wireless station; and
wherein the wireless access profile supports secured wireless connectivity to the first user equipment.

4. The method as in claim 1, wherein the input includes authentication credentials of a user operating the first user equipment.

5. The method as in claim 1, wherein detecting that the first user equipment is not yet authorized to use the network includes detecting that the first user equipment has not yet been authorized to support secured wireless connectivity with the network using a network identity specifying the secured wireless network.

6. The method as in claim 1, further comprising:
producing the wireless access profile to include access credentials including a unique identifier value and a password for use by the first user equipment to establish a secure wireless communication link with the network.

7. The method as in claim 1, further comprising:
producing the wireless access profile to specify an access type assigned for use by the first user equipment.

8. The method as in claim 1, further comprising:
subsequent to communicating the wireless access profile to the first user equipment, establishing a secured wireless communication link with the first user equipment in response to authentication of the first user equipment via credentials associated with the wireless access profile, the secured wireless communication link providing the first user equipment secured access to the network.

9. The method as in claim 8, further comprising:
establishing the secured wireless communication link based on a network identifier value retrieved from the wireless access profile, the network identifier value specifying a network name in which to establish the secured wireless communication link.

10. The method as in claim 1, further comprising:
providing the first user equipment access to the network in accordance with network usage terms associated with the wireless access profile; and
in response to expiration of a time limit associated with the wireless access profile, redirecting the first user equipment to the portal.

11. The method as in claim 10, further comprising:
via the portal, receiving supplemental input from the user equipment;
based on the supplemental input, updating the network usage terms associated with the wireless access profile; and
providing the first user equipment access to the network in accordance with the updated network usage terms associated with the wireless access profile.

12. The method as in claim 1, wherein the wireless access profile includes a network identifier name for use by the first user equipment to establish a secured wireless communication link with the network via the wireless base station.

13. The method as in claim 1, further comprising:
receiving the network access request over the first wireless communication link, the first wireless communication link established between the wireless base station and the first user equipment, the wireless base station disposed in the network; and
subsequent to communicating the wireless access profile to the first user equipment, terminating the first wireless communication link, the termination causing the first user equipment to use the wireless access profile to establish a second wireless communication link with the wireless base station.

14. The method as in claim 13, wherein the first wireless communication link is established as a non-secure connection.

15. The method as in claim 13, wherein the wireless access profile is communicated to the first user equipment over the first wireless communication link, the wireless access profile including a secure network identifier value for use by the first user equipment to establish secured wireless network connectivity with the wireless base station;
wherein the network access request is a first network access request, the method further comprising:
at the wireless base station, receiving a second network access request from the first user equipment to establish the second wireless communication link, the second network access request including the secure network identifier value.

16. The method as in claim 15, further comprising:
via the second wireless communication link, and as indicated by the secure network identifier value, providing the first user equipment access to a remote network through the wireless base station via a secure connection.

17. A method comprising:
receiving a network access request from first user equipment to use a network;
in response to detecting that the first user equipment is not yet authorized to use the network, directing the first user equipment to a portal;
communicating a wireless access profile to the first user equipment, the wireless access profile derived based on input from the first user equipment to the portal, the wireless access profile configured to provide the first user equipment wireless access to the network, the method further comprising:
at a wireless base station, receiving the network access request over a first wireless communication link between the first user equipment and the wireless base station, the first wireless communication link being a non-secured wireless communication link; and
wherein the wireless access profile includes access credentials including a unique identifier value and a password for use by the first user equipment to establish a second wireless communication link with the network as a substitute to the first wireless communication link.

18. The method as in claim 17, further comprising:
subsequent to communicating the wireless access profile to the first user equipment, establishing the second wireless communication link with the first user equipment in response to authentication of the first user equipment via credentials in the wireless access profile, the second wireless communication link providing the first user equipment secured access to the network through the wireless base station.

19. The method as in claim 1, further comprising:
in response to receiving authentication credentials from the first user equipment at the portal, producing the wireless access profile.

20. The method as in claim 1, wherein a user operating the first user equipment at a time of receiving the network access request is a non-subscriber of the network; and wherein the user operating the first user equipment becomes a subscriber of the network based on the input from the user to the portal.

21. A method comprising:

receiving a network access request from first user equipment to use a network;

in response to detecting that the first user equipment is not yet authorized to use the network, directing the first user equipment to a portal;

communicating a wireless access profile to the first user equipment, the wireless access profile derived based on input from the first user equipment to the portal, the wireless access profile configured to provide the first user equipment wireless access to the network; and wherein communicating the wireless access profile to the first user equipment includes communicating the wireless access profile from a wireless base station to the first user equipment over a first wireless communication link to the first user equipment, the wireless access profile including: i) a password provided by the user to the portal over the first wireless communication link, and ii) an identity of a secured wireless network supported by the wireless base station, the method further comprising:

in response to receiving the identity of the secured wireless network and the password from the first user equipment, establishing a second wireless communication link with the first user equipment to provide the first user equipment access to a remote network through the wireless base station, the second wireless communication link being a secured wireless communication link.

22. The method as in claim 21, wherein the first user equipment is operative to establish the second wireless communication link in response to termination of the first wireless communication link, establishment of the second wireless communication link requiring authentication of the first user equipment via communication of the password from the user equipment to the wireless base station.

23. The method as in claim 1, wherein the wireless access profile includes a password supplied by a user of the first user equipment to the portal.

24. The method as in claim 23, further comprising:

directing the first user equipment to the portal to create the wireless access profile in response to detecting that the user of the first user equipment is not yet a subscriber provided access to the network.

25. The method as in claim 13, wherein a user operating the first user equipment is a non-subscriber of the network at a time of the wireless base station receiving the network access request; and wherein the user operating the first user equipment becomes a subscriber of the network based on the input from the user to the portal.

26. The method as in claim 1, further comprising: communicating the wireless access profile to the first user equipment in response to a user of the first user equipment signing up to use a first service provided by the network.

27. A method comprising:

receiving a network access request from first user equipment to use a network;

in response to detecting that the first user equipment is not yet authorized to use the network, directing the first user equipment to a portal;

communicating a wireless access profile to the first user equipment, the wireless access profile derived based on input from the first user equipment to the portal, the wireless access profile configured to provide the first user equipment wireless access to the network;

communicating wireless access profile to the first user equipment in response to a user of the first user equipment signing up to use a first service provided by the network, the method further comprising:

in response to detecting expiration of the first service, redirecting the first user equipment to the portal; and in response to receiving additional input from the first user equipment selecting a second service provided by the network: i) updating the wireless access profile to support the second service, and ii) communicating the updated wireless access profile to the first user equipment.

28. The method as in claim 27, further comprising:

providing the first user equipment wireless access to the network via the updated wireless access profile.

29. The method as in claim 1, wherein detecting that the first user equipment is not yet authorized to use the network includes detecting that a user operating the first user equipment is not yet a subscriber authorized to use the network at a time of the wireless base station receiving the network access request.

30. The method as in claim 29, further comprising:

communicating the wireless access profile over the first wireless communication link from the wireless base station to the first user equipment; and subsequent to communicating the wireless access profile to the first user equipment, terminating the first wireless communication link, the termination of the first wireless communication link causing the first user equipment to use the wireless access profile to establish a second wireless communication link with the wireless base station.

31. The method as in claim 30, wherein the establishment of the second wireless communication link includes the first user equipment automatically establishing the second wireless communication link based upon a network identifier as specified by the wireless access profile, the first user equipment receiving notification from the wireless base station that the wireless base station supports the network as specified by the network identifier.

32. A method comprising:

receiving a network access request from first user equipment to use a network;

in response to detecting that the first user equipment is not yet authorized to use the network, directing the first user equipment to a portal;

communicating a wireless access profile to the first user equipment, the wireless access profile derived based on input from the first user equipment to the portal, the wireless access profile configured to provide the first user equipment wireless access to the network, the method further comprising:

at a wireless base station, receiving the network access request from the first user equipment over a first wireless communication link between the first user equipment and the wireless base station, the first wireless communication link being a non-secured wireless communication link; and wherein the wireless access profile includes access credentials for use by the first user equipment to establish a second wireless communication link with the network.

33. The method as in claim 32, further comprising:
subsequent to communicating the wireless access profile to the first user equipment, establishing the second wireless communication link with the first user equipment in response to authentication of the first user equipment via the access credentials in the wireless access profile, the second wireless communication link providing the first user equipment secured access to the network through the wireless base station.

34. The method as in claim 1, wherein the network access request is a first network access request, the method further comprising:
in response to receiving the identity of the secured wireless network in a second network access request from the first user equipment, establishing a second wireless communication link with the first user equipment to provide the first user equipment access to a remote network through the wireless base station, the second wireless communication link being a secured wireless communication link.

35. The method as in claim 1, wherein the wireless access profile includes a network identifier value specifying an identity of the network, the method further comprising:
at the first user equipment, receiving an advertisement notification from the wireless base station that the wireless base station supports the network as specified by the network identifier.

36. The method as in claim 1, wherein wireless access profile includes: i) an identity of the network, and ii) access credentials to use the network.

* * * * *